United States Patent
Böhler et al.

(10) Patent No.: US 12,009,672 B2
(45) Date of Patent: Jun. 11, 2024

(54) DEVICES FOR THE CONTACTLESS INDUCTIVE CHARGING OF AN ELECTRICAL ENERGY STORE

(71) Applicant: BRUSA Elektronik AG, Sennwald (CH)

(72) Inventors: Lukas Böhler, Wangs (CH); Marc Hanselmann, Frümsen (CH); Martin Hamilton, Sennwald (CH)

(73) Assignee: BRUSA Elektronik AG, Sennwald (CH)

( * ) Notice: Subject to any disclaimer, the term of this patent is extended or adjusted under 35 U.S.C. 154(b) by 666 days.

(21) Appl. No.: 17/252,173

(22) PCT Filed: Jun. 24, 2019

(86) PCT No.: PCT/EP2019/066666
§ 371 (c)(1),
(2) Date: Dec. 14, 2020

(87) PCT Pub. No.: WO2020/002233
PCT Pub. Date: Jan. 2, 2020

(65) Prior Publication Data
US 2021/0273495 A1   Sep. 2, 2021

(30) Foreign Application Priority Data

Jun. 29, 2018   (DE) .................... 10 2018 115 789.4

(51) Int. Cl.
*H02J 50/00*   (2016.01)
*B60L 53/12*   (2019.01)
(Continued)

(52) U.S. Cl.
CPC ............ *H02J 50/005* (2020.01); *B60L 53/12* (2019.02); *B60L 53/66* (2019.02); *H01F 27/36* (2013.01);
(Continued)

(58) Field of Classification Search
CPC .. H02J 50/10; H02J 50/70; H02J 50/80; H02J 50/90; H02J 50/005; H02J 7/02;
(Continued)

(56) References Cited

U.S. PATENT DOCUMENTS 8,749,334 B2 * 6/2014 Boys ................... B60L 53/12
336/84 C
10,523,258 B2 * 12/2019 Hong ................... H04B 5/0031
(Continued)

FOREIGN PATENT DOCUMENTS

DE    102016215273 A1   2/2017
DE    102016217703 A1   3/2018
WO    WO 2005/112192 A1   11/2005

OTHER PUBLICATIONS

English-language translation of the International Preliminary Report on Patentability issued in International Application No. PCT/EP2019/066666 on Jan. 7, 2021.

*Primary Examiner* — Edward Tso
*Assistant Examiner* — Aaron Piggush
(74) *Attorney, Agent, or Firm* — Hoffmann & Baron, LLP

(57) ABSTRACT

A module for contactless inductive energy transfer, including a coil that includes a magnetic core to emit or receive electrical energy using inductive coupling, wherein the magnetic core includes a hole that forms a communication channel, and a wireless communication device that includes an antenna, the antenna installed in a region of the hole and configured to transmit and receive signals via the communication channel, wherein an opposite pole of the antenna is designed as a shield that is configured to shield electronics from a magnetic file generated by the electrical energy emitted or received by the coil via the inductive coupling.

8 Claims, 1 Drawing Sheet

(51) Int. Cl.
  *B60L 53/66* (2019.01)
  *H01F 27/36* (2006.01)
  *H02J 7/02* (2016.01)
  *H02J 50/10* (2016.01)
  *H01F 27/24* (2006.01)
  *H01F 38/14* (2006.01)
  *H02J 50/70* (2016.01)
  *H02J 50/80* (2016.01)
  *H02J 50/90* (2016.01)

(52) U.S. Cl.
  CPC ................ *H02J 7/02* (2013.01); *H02J 50/10* (2016.02); *H01F 27/24* (2013.01); *H01F 38/14* (2013.01); *H02J 50/70* (2016.02); *H02J 50/80* (2016.02); *H02J 50/90* (2016.02)

(58) Field of Classification Search
  CPC .......... B60L 53/12; B60L 53/66; H01F 27/24; H01F 27/36; H01F 38/14

USPC ................................ 320/104, 107, 108, 109
  See application file for complete search history.

(56) References Cited

U.S. PATENT DOCUMENTS

| | | |
|---|---|---|
| 2007/0126650 A1 | 6/2007 | Guenther |
| 2012/0262002 A1 | 10/2012 | Widmer et al. |
| 2015/0008752 A1* | 1/2015 | Boys ........................ H02J 50/10 |
| | | 307/104 |
| 2015/0349537 A1 | 12/2015 | Milne et al. |
| 2016/0043565 A1* | 2/2016 | Asaoka .................... H02J 50/10 |
| | | 307/104 |
| 2016/0372955 A1* | 12/2016 | Fackelmeier ........... B60L 53/38 |
| 2017/0054326 A1* | 2/2017 | Toba ..................... H01F 27/366 |
| 2018/0102213 A1 | 4/2018 | Hanabusa et al. |

* cited by examiner

DEVICES FOR THE CONTACTLESS INDUCTIVE CHARGING OF AN ELECTRICAL ENERGY STORE

CROSS-REFERENCE TO RELATED APPLICATIONS

The present application is the U.S. National Phase of PCT/EP2019/066666, filed on Jun. 24, 2019, which claims priority to German Patent Application No. 10 2018 115 789.4, filed on Jun. 29, 2018, the entire contents of which are incorporated herein by reference.

BACKGROUND

Field

The invention relates to the field of vehicle technology. In particular, the present invention relates to devices for contactless inductive charging of an electrical energy store in a vehicle.

Related Art

Contactless energy transfer systems for the transfer of electrical energy can in principle be used for inductive charging of an energy store in a vehicle. A first coil (primary coil) generates a magnetic field in a first module (Ground Pad Module, GPM), which magnetic field induces current in a second coil (secondary coil) of an adjacent second module (Car Pad Module, CPM), which current can be used to charge an electrical energy store. The second module is arranged in the vehicle.

In the case of inductive energy transfer, the best possible magnetic coupling between the two coils with a low stray field is sought to be able to transfer energy as efficiently as possible. To reduce a stray field, the two coils must be positioned as precisely as possible one above the other. Because the first GPM module is typically arranged on the ground in a stationary manner, it is therefore important to control/steer the vehicle in such a way that the secondary coil is optimally arranged above the primary coil for the inductive energy transfer.

To position the second module of the vehicle above the first module and/or to carry out the inductive energy transfer, information/data is exchanged between the first module and the second module. For this purpose, appropriate communication devices are available in both modules, which typically enable a bidirectional communication link between the first and second module. However, technical difficulties arise here because the communication link can be disturbed by electromagnetic fields that occur during the inductive energy transfer between the primary coil and the secondary coil.

SUMMARY

It is an object of the present invention to provide a module for energy transfer having a coil that enables improved communication with a communication device arranged in the module.

The invention results from the features of the independent claims. Advantageous further refinements and embodiments are the subject of the dependent claims. Further features, potential applications, and advantages of the invention result from the following description and from the explanation of embodiments of the invention, which are shown in the drawings.

A first aspect of the invention relates to a module for contactless inductive energy transfer, in particular, to a vehicle for charging a vehicle-mounted energy store. According to the invention, the module includes an electrical coil for transferring and/or receiving electrical energy via an inductive coupling. The coil has a magnetic core. The module further includes a wireless communication device. According to the invention, the magnetic core has a hole that forms a communication channel for the communication device.

The communication device is preferably a transmitting and receiving unit for receiving and emitting the signals. At least one antenna of the communication device that is used to emit and receive signals is advantageously arranged in the region of the hole of the magnetic core such that the signals to and from the antenna substantially only run through the communication channel. Electronics for controlling the antenna or for evaluating the signals received by the antenna can, but do not need to, be arranged in the region of the hole. The communication device advantageously uses a WLAN protocol for communication. Of course, the use of other known data transfer protocols is encompassed by the idea of the invention.

The communication device is advantageously used for communication with a further module for inductive energy transfer and/or for communication with another unit, in particular, a vehicle.

The magnetic core consists, in particular, of a ferrite material. The electrical coil is advantageously designed as a flat coil.

In the present case, the recess in the magnetic core is to be understood as a removal of material that is replaced by ambient air or another non-magnetically conductive material. A different magnetic permeability is therefore present in the recess than in the material of the magnetic core. The recess can be designed in the form of a depression. The depression can represent a closed channel through which communication can take place. For example, the closed channel can also be provided by a through channel that is closed at one or both ends, for example, by a cover that has magnetic or non-magnetic material.

In an advantageous embodiment, the hole is designed as a through channel through the magnetic core. The channel axis of the through channel advantageously runs parallel to the coil axis of the coil. The through channel advantageously forms a rectangular or square or round or elliptical cross section. Furthermore, it can advantageously be provided that the through channel has a constant cross section. This has advantages when it comes to manufacturing the module and advantages in the transmission of the high-frequency communication signals through the channel. In this way, for example, reflections of electromagnetic waves from the communication link can be avoided.

The hole or the through channel is advantageously arranged centrally with respect to the magnetic core of the coil. This means that the hole is arranged in the center of the energy coil in a cross-sectional view and is completely surrounded by it. Such a symmetrical arrangement is advantageous with regard to the electromagnetic field that is conducted in the interior of the magnetic core in the form of electromagnetic field lines. The recess is largely avoided by the electromagnetic field lines such that there is a lower field strength caused by the energy transfer. A central recess has the advantage that the magnetic core has an irregularity in its interior that, however, does not interfere with the energy transfer.

Furthermore, it can advantageously be provided in one embodiment that the antenna has a shield.

The cross-sectional area of the through channel is advantageously 1 cm² to about 500 cm², but in particular 1-100 cm², 1-50 cm², 5-25 cm², 5-15 cm², 5-10 cm².

An advantageous embodiment is characterized in that the module has a shield that has a signal-permeable region/opening for signals from the communication device to enter and exit.

An advantageous further embodiment is characterized in that the communication device has one or more antennas for emitting/receiving signals, the antenna(s) being installed in the region of the recess/through channel. In particular, the antenna(s) is/are installed within the through channel. The antenna(s) is/are particularly advantageously installed in the middle with respect to the recess/through channel.

The recess/through channel is advantageously dimensioned in such a way that the antenna substantially achieves a horizontal radiation angle of 360°. In particular, the diameter of the recess/through channel is larger than the antenna diameter, in particular, the diameter is 1.5 to 5 times the antenna diameter.

An opposite pole of the antenna is also advantageously designed as a shield. The shield is designed, for example, as a copper layer and is used, in particular, to shield the strong magnetic fields during the inductive transfer of energy into or from the coil of the module. In particular, it is thus possible to arrange control electronics on a side of the copper layer opposite the antenna. In other words, the sequence, seen in the direction of incidence of the signals, is as follows: antenna, shield, e.g., a copper layer, and electronics.

The proposed module is advantageously integrated into a housing. The housing can, for example, be an aluminum housing that has one or more openings, for example in the form of slots. These openings can easily be used as an antenna for HF signals (HF=high frequency).

Because the electromagnetic coupling of the coil generates high field strengths during operation, communication with the communication device can be significantly disrupted. The present invention thus proposes a possibility of designing the communication link in such a way that, through a targeted geometric configuration of the magnetic core of the energy coil and a corresponding arrangement of the communication device, in particular, an antenna of the communication device, in the region of the magnetic core, disruption-free communication or communication with higher transfer quality can take place.

Furthermore, the invention proposes an advantageous positioning of the communication device, for example, in the form of a WLAN transmitting/receiving device, in the region of the magnetic core of the coil of an energy-transferring module. The proposed module enables noticeably improved communication, in particular, between two such modules, during an energy transfer to or from the coil of the module.

Another aspect of the invention relates to a system for inductive energy transfer to a vehicle for charging a vehicle-mounted energy store, the system including a first GPM module that is arranged, in particular, in a stationary manner on the ground and has a primary coil, and a second CPM module that is arranged in the vehicle and has a secondary coil, the first GPM module and or the second CPM module being a module as described above.

The vehicle is, for example, a land vehicle such as a car, a truck or the like, or an aircraft such as an airplane, a helicopter or the like.

Both the first GPM module and the second CPM module are advantageously designed as described above. The communication between the first GPM module and the second CPM module or the vehicle serves, in particular, to implement optimum positioning of the vehicle such that the second CPM module is optimally placed above the first GPM module, thus achieving optimum inductive coupling between the primary coil (GPM) and secondary coil (CPM). Furthermore, the communication between the first GPM module and the second CPM module is used to optimally control the process of energy transfer from the first GPM module to the vehicle-mounted second CPM module. In particular, for this purpose, the present invention enables more reliable communication between the two modules.

A final aspect of the invention relates to a vehicle having a module as described above. This module corresponds to the second CPM module and is used, in particular, to receive energy inductively transferred from a first GPM module to the vehicle, in particular, to charge a vehicle-mounted energy store.

Further advantages, features and details result from the following description, in which—if necessary with reference to the drawings—at least one exemplary embodiment is described in detail. Identical, similar, and/or functionally identical parts are provided with the same reference numerals.

DETAILED DESCRIPTION

Figure 1:
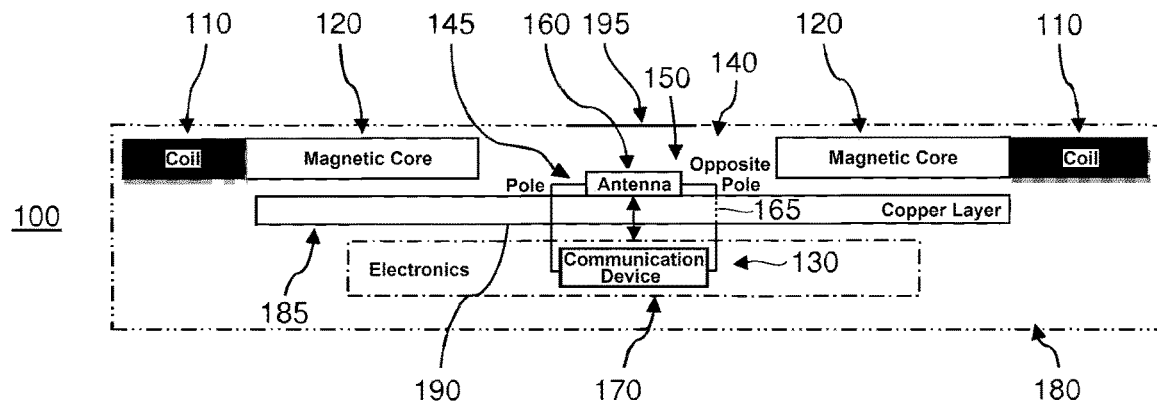
FIG. 1 shows a schematically illustrated embodiment of a module according to the invention in cross-sectional view.

FIG. 1 shows a schematically illustrated embodiment of a module 100 according to the invention for contactless inductive energy transfer in a cross-sectional view. The module 100 has a flat coil 110 via which electrical energy can be transferred to a further module 100 (not shown) via an inductive coupling. A ferromagnetic core 120, which is used to guide the magnetic field, is arranged within the flat coil 110. The ferromagnetic core 120 has a hole 140 in the middle/center that, in the present case, is designed as a through channel 150. In the present case, an antenna 160 of a communication device 130 is again arranged in the middle/center in the region 145 of the hole 140 or through channel 150. The antenna 160 is electrically connected to the communication device 130 via a pair of electrical poles, including a first pole or simply a pole (not individually numbered) and a second opposite pole or simply opposite pole 165. The communication device 130 has transmission/reception electronics 170 that control the antenna 160 to emit signals and evaluate signals received by the antenna 160. While the pole connects the antenna 160 directly to the communication device 130, the connection of the opposite pole 165 is described in detail immediately below. The transmission/reception electronics 170 of the communication device 130 connected to the antenna 160 are shielded by a shield 185, wherein the opposite pole 165 of the antenna 160 is designed as the shield 185, i.e., the opposite pole 165 electrically connects the antenna 160 and the communication device 130 via the shield 185. In the present case, the shield 185 is a copper layer 190 that is arranged below the antenna 160 and that serves in particular to shield the electronics 170 of the communication device 130 from the main magnetic field during energy transfer. Further electronic components (not shown) are arranged in this region of the module 100. The module has a housing 180 that is designed in the region above the antenna 160 in such a way that signals can pass almost unhindered. In particular, the housing 180 includes a signal-permeable region 195 that allows the signals to enter and exit.

The hole 140, designed as a through channel 150, in the magnetic core 120 of the coil 110 creates a communication channel for signals from the communication device through which substantially all of the signals emitted or received by the communication device are passed. The module 100 shown enables secure, robust communication even during the inductive energy transfer into or from the coil.

Figure 2:
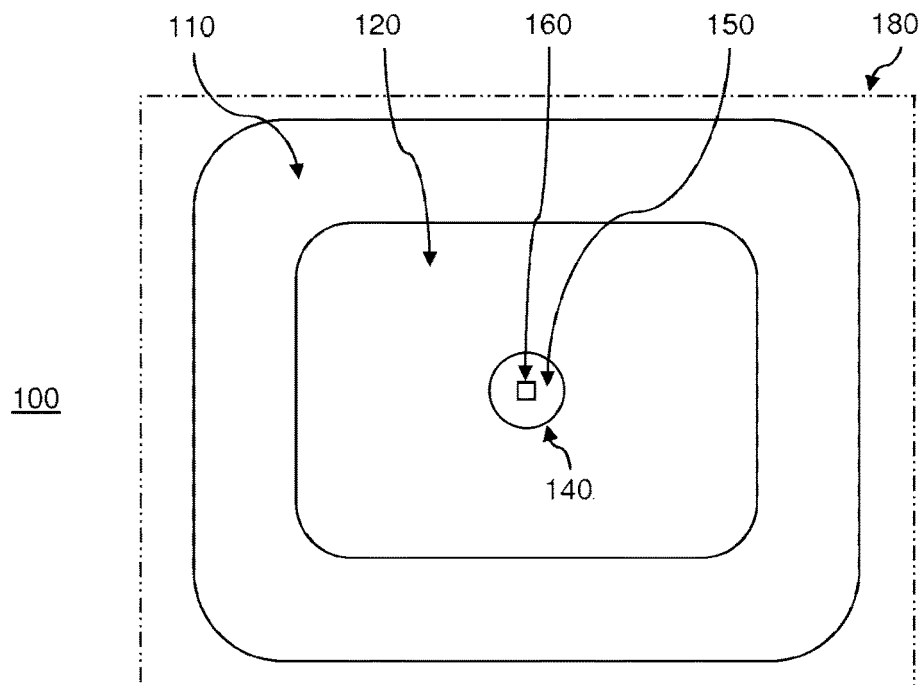
FIG. 2 shows the embodiment of FIG. 1 in a plan view.

FIG. 2 shows the embodiment of FIG. 1 in plan view. The almost rectangular flat coil 110, the ferromagnetic core 120 made of a ferrite material arranged within the flat coil, and the hole 140 arranged centrally within the magnetic core 120, which hole 140 forms a through channel 150 through the ferromagnetic core 120, can be clearly seen. The antenna 160 of the communication device 130 is again arranged centrally in the region of the through channel 150.

Figure 3:
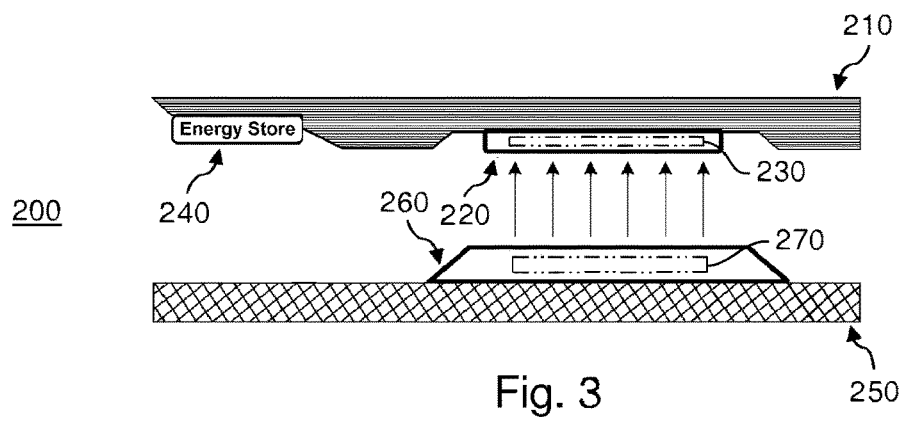
FIG. 3 shows a schematically illustrated embodiment of a system for inductive energy transfer to a vehicle according to the invention.

FIG. 3 shows a schematically illustrated embodiment of a system 200 for inductive energy transfer to a vehicle 210 according to the invention. The modules proposed herein are particularly suitable for use in the system 200 for inductive energy transfer, as shown by the arrows, to the vehicle 210 for charging a vehicle-mounted energy store 240. Such a system 200 has, in particular, a first GPM module 260 that is arranged in a stationary manner on the ground 250 and has a primary coil 270, and a second CPM module 220 that is arranged in the vehicle 210 and has a secondary coil 230. Either or both of the first GPM module 260 and the second CPM module 220 are advantageously designed as a module 100 of FIG. 1 according to the invention.

This enables improved, more reliable and more robust communication between the first GPM module 260 and the second CPM module 220. In a first phase, the communication serves to optimally position the vehicle 210 or the second CPM module 220 above the first GPM module 260. After the vehicle 210 is optimally positioned, the communication is used to optimally control the inductive energy transfer from the first GPM 260 module to the second CPM module 220.

Although the invention has been illustrated and explained in greater detail by means of preferred example embodiments, the invention is not limited by the disclosed examples and other variations may be derived therefrom by a person skilled in the art without departing from the scope of protection of the invention. It is therefore clear that there are a plurality of possible variations. It is also clear that embodiments cited by way of example actually only constitute examples that are not to be interpreted in any way as a limitation of the scope, of the potential applications, or of the configuration of the invention. Instead, the preceding description and the description of the figures enable the person skilled in the art to specifically implement the example embodiments, wherein the person skilled in the art has knowledge of the disclosed inventive concept and is able to make numerous changes, for example, with respect to the function or the arrangement of individual elements cited in an exemplary embodiment, without departing from the scope of protection, which is defined by the claims and their legal equivalents, such as a further explanation in the description.

LIST OF REFERENCE SIGNS

100 module for contactless inductive energy transfer
110 coil
120 magnetic core
130 communication device
140 hole
145 region of the hole
150 through channel
160 antenna
165 opposite pole of the antenna
170 control/evaluation electronics
180 housing
185 shield
190 copper layer for shielding
195 signal-permeable region
200 system for contactless inductive energy transfer
210 vehicle
220 second car pad module (CPM)
230 secondary coil
240 energy store
250 ground
260 first ground pad module (GPM)
270 primary coil

The invention claimed is:

1. A module for contactless inductive energy transfer, the module comprising:
   a coil including a magnetic core to emit or receive electrical energy using inductive coupling, the magnetic core including a hole that forms a communication channel; and
   a wireless communication device including an antenna, the antenna installed in a region of the hole and configured to transmit and receive signals via the communication, channel formed in the magnetic core, wherein an opposite pole of the antenna is designed as a shield configured to shield electronics from a magnetic field generated b the electrical energy emitted or received by the coil via the inductive coupling.

2. The module according to claim 1, wherein the magnetic core consists of a ferromagnetic material.

3. The module according to claim 1, wherein the hole is designed as a through channel.

4. The module according to claim 3, wherein the through channel has a rectangular, a round, or an elliptical cross section.

5. The module according to claim 1, wherein the hole is arranged centrally with respect to the magnetic core of the coil.

6. The module according to claim 1, wherein the module has a shield housing, the housing has a signal-permeable region for the signals to enter or exit.

7. A system for inductive energy transfer to a vehicle for charging a vehicle-mounted energy store, the system comprising:
   a ground pad module (GPM module) arranged in a stationary manner on a ground, the GPM module having a primary coil; and
   a car pad module (CPM module) arranged in the vehicle, the CPM module having a secondary coil, the (GPM module and/or the CPM module being a module according to claim 1.

8. A vehicle having a module according to claim 1.

* * * * *